(No Model.)

J. A. CLOTHER.
MEAT TENDERER.

No. 307,100. Patented Oct. 28, 1884.

Witnesses
Geo. F. Graham
Sol. Stein

Inventor
Jane A. Clother
per Voorhees & Singleton
attys.

N. PETERS, Photo-Lithographer, Washington, D. C.

UNITED STATES PATENT OFFICE.

JANE A. CLOTHER, OF CUMBERLAND, WISCONSIN.

MEAT-TENDERER.

SPECIFICATION forming part of Letters Patent No. 307,100, dated October 28, 1884.

Application filed September 29, 1883. (No model.)

*To all whom it may concern:*

Be it known that I, JANE A. CLOTHER, of Cumberland, in the county of Barron and State of Wisconsin, have invented certain new and useful Improvements in Meat-Tenderers; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1:
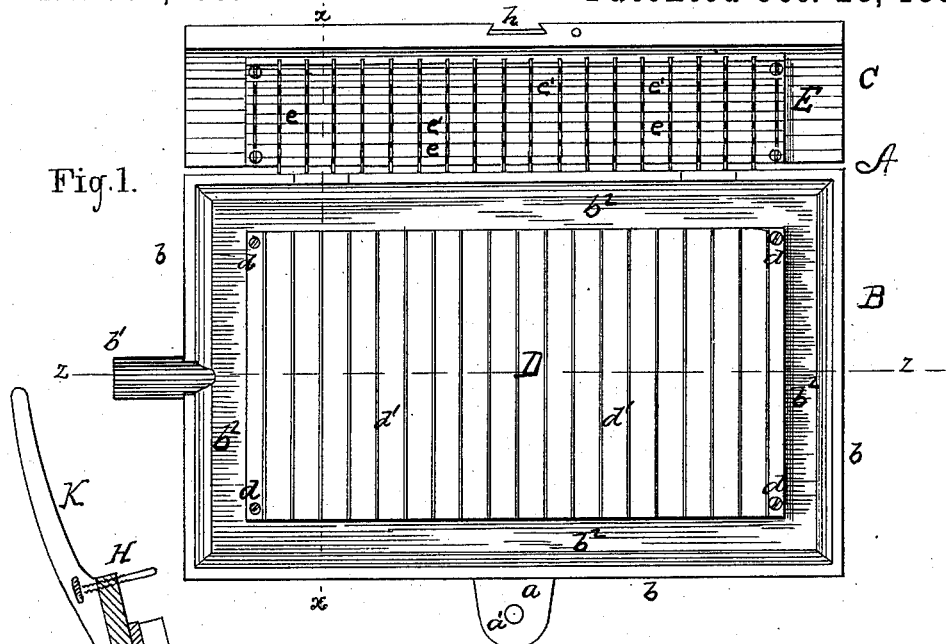
Figure 2:
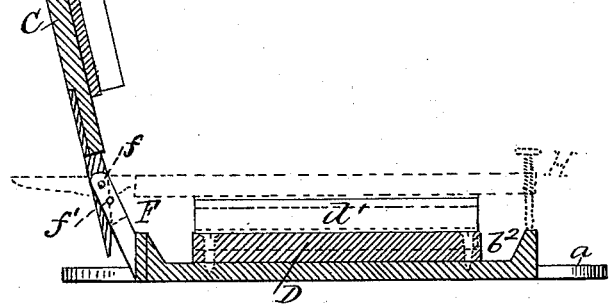
Figure 3:
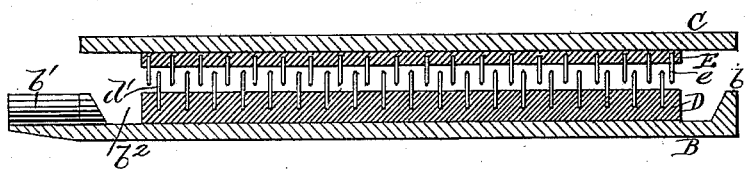

Figure 1 is a top view of the device opened; Fig. 2, a transverse section on line $x\ x$, Fig. 1; Fig. 3, a longitudinal section on line $z\ z$.

This invention relates to meat-tenderers, and has for its object the production of a device in which pieces of meat of varying thicknesses can be slashed for tendering and for seasoning.

In the annexed drawings, the letter A indicates the "slasher," consisting of the bottom B and top C, hinged together. This slasher is provided with a lug, $a$, having a hole, $a'$, so that, if desired, it can be secured to a table. The bottom B is made hollow inside, has a rim, $b$, all round, and is provided with a spout, $b'$. Within this hollow bottom is secured, by screws $d$ or otherwise, the cutting-plate D, leaving a space or channel, $b^2$, all around between such plate D and the rim $b$. The plate D is made with a series of parallel transverse knives or cutters, $d'$, and can be removed, if broken, and replaced with a new one. Secured detachably to the inside of the top C is a similar cutting-plate. E, having cutters $e$. The arrangement of the plates D and E is such that the cutters $e$ come between the cutters $d$ when the device is closed.

As shown in the drawings, the cutters $e$ are provided with notches $e'$, forming such cutters $e$ into teeth. This construction allows the meat to be punctured without being slit continuously. The lid or top C is held to the bottom B by the hinges F. These hinges have two holes, $f\ f'$, so that the length of the hinge may be varied, bringing the two plates of the slasher closer together or farther apart. In the top C is placed a set-screw, H, which limits the space between the top and bottom when the device is closed. The top is also provided with a handle, K, which fits a dovetailed groove, $h$, in the top.

This device is intended to be used after the meat is cooked. The cooked steak is placed upon the cutters $d$, the hinge F being adjusted to suit the thickness of the meat, and the set-screw H moved the proper distance. The lid is then brought down. The meat, being caught between the two sets of cutters, is slit and punctured, breaking the crust. Any gravy or juice is caught in the channel $b$ and can be poured out of the spout $b'$. This slashing of the meat, breaking the crust, places it in a good condition for the seasoning, the latter entering into the meat and mingling with it, instead of simply resting on the surface.

I am aware that a gridiron is provided with a groove for catching gravy, and with a spout for pouring it off; also that meat-slashers have been provided with cutting-plates similar to mine.

What I claim is—

A meat-tenderer consisting of the top C, having the cutting-plate E, and the bottom B, having the cutting-plate D, rim $b$, spout $b'$, and channel $b^2$ between the cutting-plate and the rim, as set forth.

In testimony that I claim the foregoing as my own I affix my signature in presence of two witnesses.

JANE A. CLOTHER.

Witnesses:
Mrs. J. H. McMANUS,
EMMA RUNNELS.